United States Patent
Jonsson et al.

(10) Patent No.: US 9,160,864 B2
(45) Date of Patent: Oct. 13, 2015

(54) SYSTEMS AND METHODS FOR STEREO ECHO CANCELLATION

(75) Inventors: Ragnar H. Jonsson, Laguna Niguel, CA (US); Sverrir Olafsson, Newport Beach, CA (US); Trausti Thormundsson, Irvine, CA (US)

(73) Assignee: CONEXANT SYSTEMS, INC., Irvine, CA (US)

( * ) Notice: Subject to any disclaimer, the term of this patent is extended or adjusted under 35 U.S.C. 154(b) by 663 days.

(21) Appl. No.: 13/344,510

(22) Filed: Jan. 5, 2012

(65) Prior Publication Data

US 2012/0170755 A1    Jul. 5, 2012

Related U.S. Application Data

(60) Provisional application No. 61/430,049, filed on Jan. 5, 2011.

(51) Int. Cl.
*H04M 9/08* (2006.01)
(52) U.S. Cl.
CPC .................................. *H04M 9/082* (2013.01)
(58) Field of Classification Search
CPC ..... H04M 9/082; H04R 3/02; H04R 2499/13; H04B 3/23
USPC ........ 381/66, 93, 95, 96; 379/406.06, 406.08, 379/406.09, 406.12, 406.14
See application file for complete search history.

(56) References Cited

U.S. PATENT DOCUMENTS

| 5,761,318 | A  | * | 6/1998  | Shimauchi et al. ............. 381/66 |
| 7,359,522 | B2 |   | 4/2008  | Aarts et al. |
| 7,403,609 | B2 |   | 7/2008  | Hirai et al. |
| 7,660,425 | B1 |   | 2/2010  | Reed et al. |
| 7,925,007 | B2 |   | 4/2011  | Stokes, III et al. |
| 7,925,008 | B2 | * | 4/2011  | Hirai et al. ............... 379/406.08 |
| 2006/0002547 | A1 | | 1/2006 | Stokes et al. |
| 2008/0031466 | A1 | | 2/2008 | Buck et al. |
| 2008/0198779 | A1 | | 8/2008 | Jaermyr et al. |
| 2008/0304675 | A1 | | 12/2008 | Roovers |
| 2010/0266118 | A1 | | 10/2010 | Thi et al. |

FOREIGN PATENT DOCUMENTS

EP    1848243 A1    10/2007

OTHER PUBLICATIONS

European Patent Office; International Search Report and Written Opinion; PCT Application No. PCT/US2012/020372, Apr. 17, 2012.

(Continued)

*Primary Examiner* — Vivian Chin
*Assistant Examiner* — David Ton
(74) *Attorney, Agent, or Firm* — Haynes and Boone, LLP

(57) ABSTRACT

Acoustic echoes in communications systems are distracting and undesirable. Acoustic echoes occur in communications systems where sound produced by a speaker is picked up by a microphone in a communications system. In a stereo playback environment, echo cancellation techniques become more complicated. Echo cancellation can be performed by performing echo cancellation on a center signal, which is the sum of a left channel signal and the right channel signal, or left signal and a difference signal, which is the difference of the right channel signal and the left channel signal. The adaptation rates of the two echo cancellers meet certain constraints to prevent degeneracies in the echo cancellation system.

17 Claims, 15 Drawing Sheets

(56) References Cited

OTHER PUBLICATIONS

Taiwan Patent Office; Office Action; Taiwan Patent Application No. 100100695; Oct. 21, 2013.
Taiwan Patent Office; Office Action (English translation); Taiwan Patent Application No. 100100695; Oct. 21, 2013.
Benesty, Jacob, et al; A Better Understanding and an Improved Solution to the Specific Problems of Stereophonic Acoustic Echo Cancellation; IEEE Transactions on Speech and Audio Processing, vol. 6, No. 2, Mar. 1998, pp. 156-165.
Emura, Satoru, et al; Enhanced Frequency-Domain Adaptive Algorithm for Stereo Echo Cancellation; IEEE, 2002; pp. 1901-1904.
Gansler, Tomas, et al; New Insights Into the Stereophonic Acoustic Echo Cancellation Problem and an Adaptive Nonlinearity Solution; IEEE Transactions on Speech and Audio Processing, vol. 10, No. 5, Jul. 2002; pp. 257-267.
Makino, Shoji, et al; Subband Stereo Echo Canceller Using the Projection Algorithm With Fast Convergence to the True Echo Path; Acoustics Speech and Signal Processing 1997 ICASSP97 1997 IEEE International Conference on (1997) vol. 1, pp. 299-302 vol. 1.
Makino, Shoji; Sterophonic Acoustic Echo Cancellation: An Overview and Recent Solutions; Acoust. Sci. & Tech. 22, 5 (2001), pp. 325-333.
Shimauchi, Suehiro, et al; Stereo Projection Echo Canceller With True Echo Path Estimation; IEEE, 1995; pp. 3059-3062.
Yukawa, Masahiro, et al; Efficient Fast Stereo Acoustic Echo Cancellation Based on Pairwise Optimal Weight Realization Technique; Published in: Journal EURASIP Journal on Applied Signal Processing archive, vol. 2006, Jan. 1.
The International Bureau of WIPO; International Preliminary Report on Patentability; PCT Application No. PCT/US2012/020372, Jul. 18, 2013.

* cited by examiner

SYSTEMS AND METHODS FOR STEREO ECHO CANCELLATION

CROSS REFERENCE

This application claims the benefit of U.S. Provisional Application No. 61/430,049, filed Jan. 5, 2011, which is incorporated by reference in its entirety for all purposes.

BACKGROUND OF THE INVENTION

1. Field of the Invention

The present disclosure relates generally to two-way communications systems and, specifically, to the suppression and cancellation of echoes in two-way communications system with stereo output.

2. Related Art

Acoustic echoes in communications systems are distracting and undesirable.

Acoustic echoes occur in communications systems where sound produced by a speaker is picked up by a microphone in the communications system. With the growing use of personal computers (PCs) for communications, such as voice over Internet protocol (VoIP), including Skype, echo cancellation when stereo speakers are in use has become a growing problem.

Solutions to the stereo echo and in general multi speaker echo problems have focused on conditioning the signals to be orthogonal, making each speaker signal easier to isolate and cancel from a sound wave received by a microphone. However, increasing the conditioning that is applied to speaker signals also increases the distortion that can potentially be introduced, and at a minimum, such solutions are very complicated and introduce a significant increase in computational complexity.

SUMMARY OF INVENTION

A method of cancelling echo from a stereo system comprising subtracting the a first far-end signal from a second far-end signal to generate a difference signal, approximating a first echo by applying an adaptive filter to the first far-end signal, approximating a difference echo by applying another adaptive filter to the difference signal, subtracting the first echo and subtracting the difference echo from an input signal. The subtraction of the two echoes can take place sequentially or simultaneously. The adaptation rate of the two adaptive filters can be different, for instance, the adaptation rate for the first adaptive filter can be larger than for the adaptive filter for the difference signal. Alternatively, the adaptation rates can be based on the relative strengths of the signals. The method can also include synthesizing echoes of the first far-end signal, the second far-end signal and/or the difference signal, and adding the synthetic echo to the input signal. The first far-end signal and the difference signal can be subdivided into subbands, where echo cancellation can be performed on a subband basis, including the use of non-linear processing.

Another method of cancelling echo from a stereo system comprises subtracting a first far-end signal from a second far-end signal to generate a difference signal, adding the first far-end signal to the second far-end signal to generate a center signal, approximating a center echo by applying an adaptive filter to the center signal, approximating a difference echo by applying another adaptive filter to the difference signal, subtracting the center echo and subtracting the difference echo from an input signal. The subtraction of the two echoes can result in two different signals to drive the update of the adaptive filters. The adaptation rate of the two adaptive filters can be different. For instance, the adaptation rate for the first adaptive filter can be larger than the adaptation rate for the adaptive filter for the difference signal. Alternatively, the adaptation rates can be based on the relative strengths of the signals, or based on a measure of correlation between the two signals. The method can also include synthesizing echoes of the first far-end signal, the second far-end signal, the center signal, and/or the difference signal, and adding the synthetic echo to the input signal. The center signal and the difference signal can be subdivided into sub-bands, where echo cancellation can be performed on a sub-band basis, including the use of non-linear processing.

Other systems, methods, features, and advantages of the present disclosure will become apparent to one with skill in the art upon examination of the following drawings and detailed description. It is intended that all such additional systems, methods, features, and advantages be included within this description, within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure.

Figure 1:
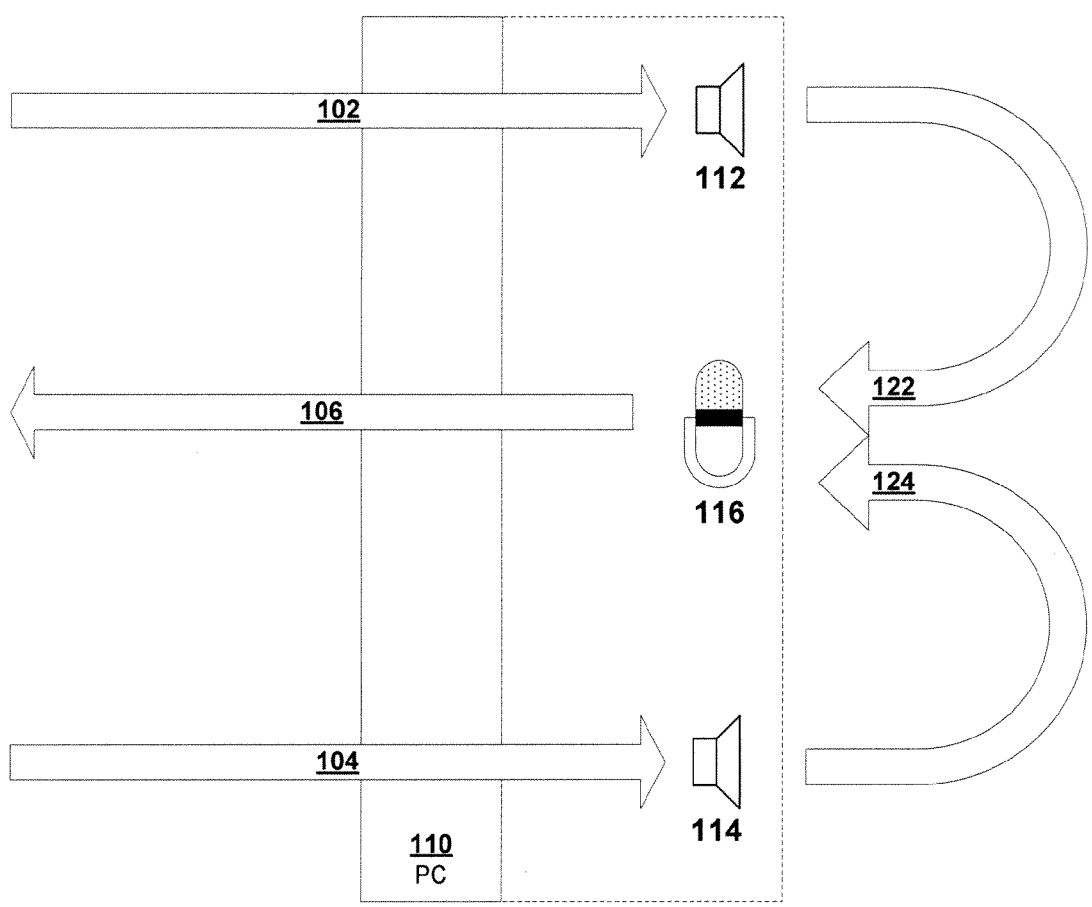
FIG. 1 illustrates echoes in a stereo communications system in a PC in accordance with an exemplary embodiment of the present disclosure.

FIG. 1 illustrates acoustic echo signal paths in a stereo communications system for personal computer (PC) 110, in accordance with an exemplary embodiment of the present disclosure. Left far-end signal 102 is generated by left speaker 112 and right far-end signal 104 is generated by right speaker 114. Echo signal 122 of left far-end signal 102 and echo signal 124 of right far-end signal 104 are picked up by microphone 116 and combined with the near-end signal into received signal 106, which is generated using echo cancellation 128 in accordance with the teachings disclosed herein. Microphone 116 and speakers 112 and 114 can be built into PC 110 or can be external.

Figure 2:
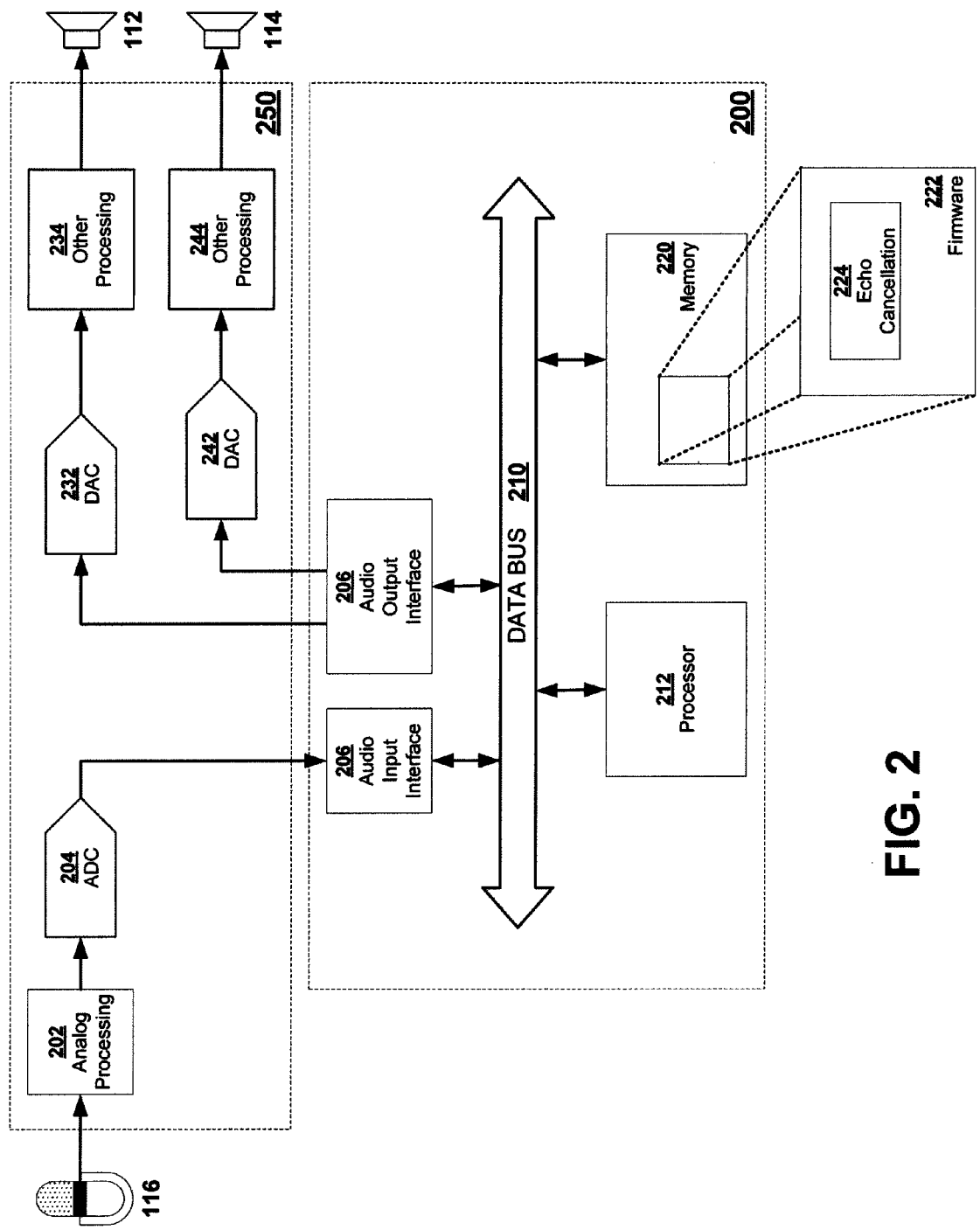
FIG. 2 is a diagram illustrating an exemplary embodiment of an audio driver.

FIG. 2 is a diagram illustrating an exemplary embodiment of an audio driver comprising digital front end 200 and backend 250. In this implementation, digital front end 200 comprises memory 220, processor 212, audio input interface 206 and stereo audio output interface 208, wherein each of these devices is coupled across one or more data buses 210. Though the illustrative embodiment shows an implementation using a separate processor and memory, other embodiments include an implementation in software and hardware as part of an application, an implementation in hardware using signal processing components, or a suitable combination of hardware and software.

As used herein, "hardware" can include a combination of discrete components, an integrated circuit, an application specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections. In one exemplary embodiment, a communications medium can be a network or other suitable communications media.

Audio input interface 206 receives audio input data from backend 250. In this example, an audio signal is received by microphone 116 and processed by analog processing module 202, which can comprise an amplifier, a gain control circuit or other suitable signal conditioning or processing components. The processed signal is then digitized by analog to digital converter (ADC) 204. Audio output interface 208 transmits stereo audio data to backend 250. In this example, a stereo audio signal comprising a left and right channel is transmitted to digital to analog converters (DAC) 232 and 242 respectively. Additional analog processing is performed by analog processing modules 234 and 244, which can comprise an amplifier, an output driver or other suitable components. In other embodiments, a class-D amplifier can be used, thus eliminating the need for a DAC.

Processor 212 can include a central processing unit (CPU), an auxiliary processor associated with the audio system, a semiconductor based microprocessor (in the form of a microchip), a macroprocessor, one or more application specific integrated circuits (ASICs), digital logic gates, a digital signal processor (DSP) or other suitable hardware for executing instructions.

Memory 220 can include one or more volatile memory elements (e.g., random-access memory (RAM) such as DRAM, and SRAM), nonvolatile memory elements (e.g., flash, read only memory (ROM), or nonvolatile RAM), or other suitable components. Memory 220 stores one or more separate programs, each of which includes an ordered listing of executable instructions for implementing logical functions to be performed by the processor 212. The executable instructions include firmware 222 which controls and manages many functions of the audio driver. The firmware 222 comprises executable instructions for echo cancellation module 224 which are described below. Firmware 222 can also comprise instructions for performing audio processing operations, such as equalization, filtering or other suitable operations. In alternate embodiments, the logic for performing these processes can be implemented in hardware or a combination of software and hardware.

In another exemplary embodiment, such as where hardware audio drivers are not available for modification, the echo cancellation can be implemented in software, such as in part of a VoIP application for a personal computer (PC) which is interfaced to a sound card, can be implemented as an "app" for a smart phone for the playback of sound, or can be implemented in other suitable embodiments.

Figure 3:
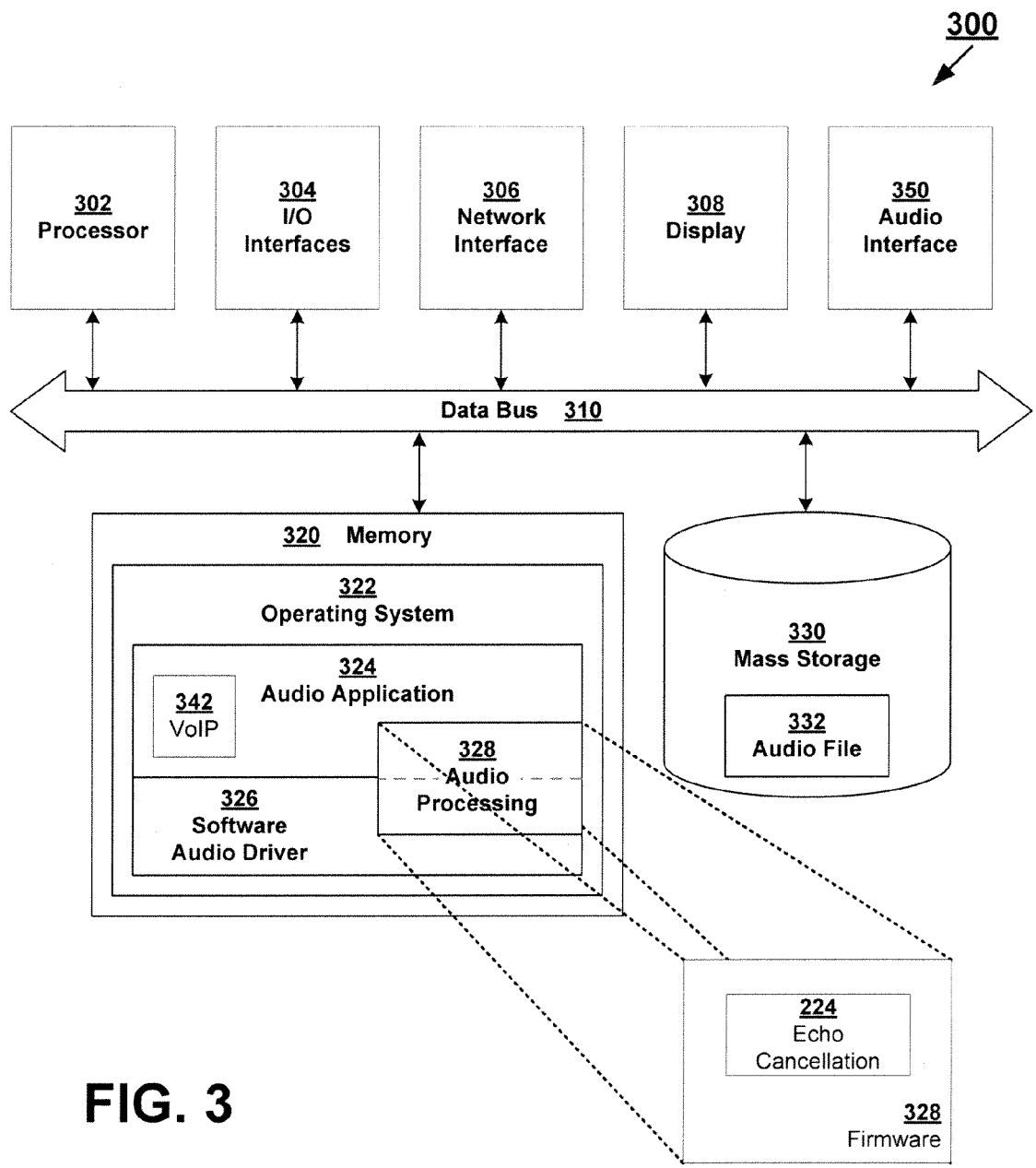
FIG. 3 illustrates an exemplary embodiment of a PC equipped with echo cancellation.

FIG. 3 illustrates an embodiment of a PC equipped with echo cancellation. Generally speaking, PC 300 can comprise any one of a wide variety of computing devices, such as a desktop computer, portable computer, dedicated server computer, multiprocessor computing device, cellular telephone, personal digital assistant (PDA), handheld or pen based computer, tablet computer, embedded appliance and so forth. Regardless of its specific arrangement, PC 300 can, for instance, comprise memory 320, processor 302, a number of input/output interfaces 304, and mass storage 330, wherein each of these devices is connected across one or more data buses 310. Optionally, PC 300 can also comprise a network interface device 306 and display 308, also connected across one or more data buses 310.

As in audio driver 200, processing device 302 can include a central processing unit (CPU), an auxiliary processor associated with the audio system, a semiconductor based microprocessor (in the form of a microchip), a macroprocessor, one or more application specific integrated circuits (ASICs), digital logic gates, a digital signal processor (DSP) or other hardware for executing instructions.

Input/output interfaces 304 provide a suitable number of interfaces for the input and output of data. For example, these components can interface with a user input device (not shown), such as keyboard, a mouse or other suitable devices. In other examples especially a handheld device (e.g., PDA, mobile telephone), these components can interface with function keys or buttons, a touch sensitive screen, a stylus, etc. Display 308 can comprise a computer monitor or a plasma screen for a PC, a liquid crystal display (LCD) on a hand held device, or other suitable displays.

Network interface device 306 comprises various components used to transmit and/or receive data over a network environment. By way of example, these can include a device that can communicate with both inputs and outputs, for instance, a modulator/demodulator (e.g., a modem), wireless (e.g., radio frequency (RF)) transceiver, a telephonic interface, a bridge, a router, network card, or other suitable devices.

Memory 320 can include any one of a combination of volatile memory elements and nonvolatile memory elements. Mass storage 330 can also include nonvolatile memory elements (e.g., flash, hard drive, tape, rewritable compact disc (CD-RW), etc.). Memory 320 comprises software which can include one or more separate programs, each of which includes an ordered listing of executable instructions for implementing logical functions. Often, the executable code can be loaded from nonvolatile memory elements, including from components of memory 320 and mass storage 330. The software can include native operating system 322, one or more native applications, emulation systems, or emulated applications for a suitable operating system and/or emulated hardware platform, emulated operating systems, or other suitable software. The software can further include audio application 324 which can be either a stand-alone application or a plug-in. The audio application can contain software to implement VoIP protocol 342. The software can further include software audio driver 326 which is used by applications to communicate with a hardware audio driver. Audio driver 326 can further comprise audio processing software 328 which comprises echo cancellation software 224. Audio processing software 328 can also comprise instructions for performing audio processing operations such as equalization and filtering. Alternatively, audio application 324 comprises audio processing software 328. It should be noted, however, that the logic for performing these processes can also be implemented in hardware or a suitable combination of software and hardware.

Mass storage 330 can be formatted into one of a number of file systems which divide the storage medium into files.

Figure 4:
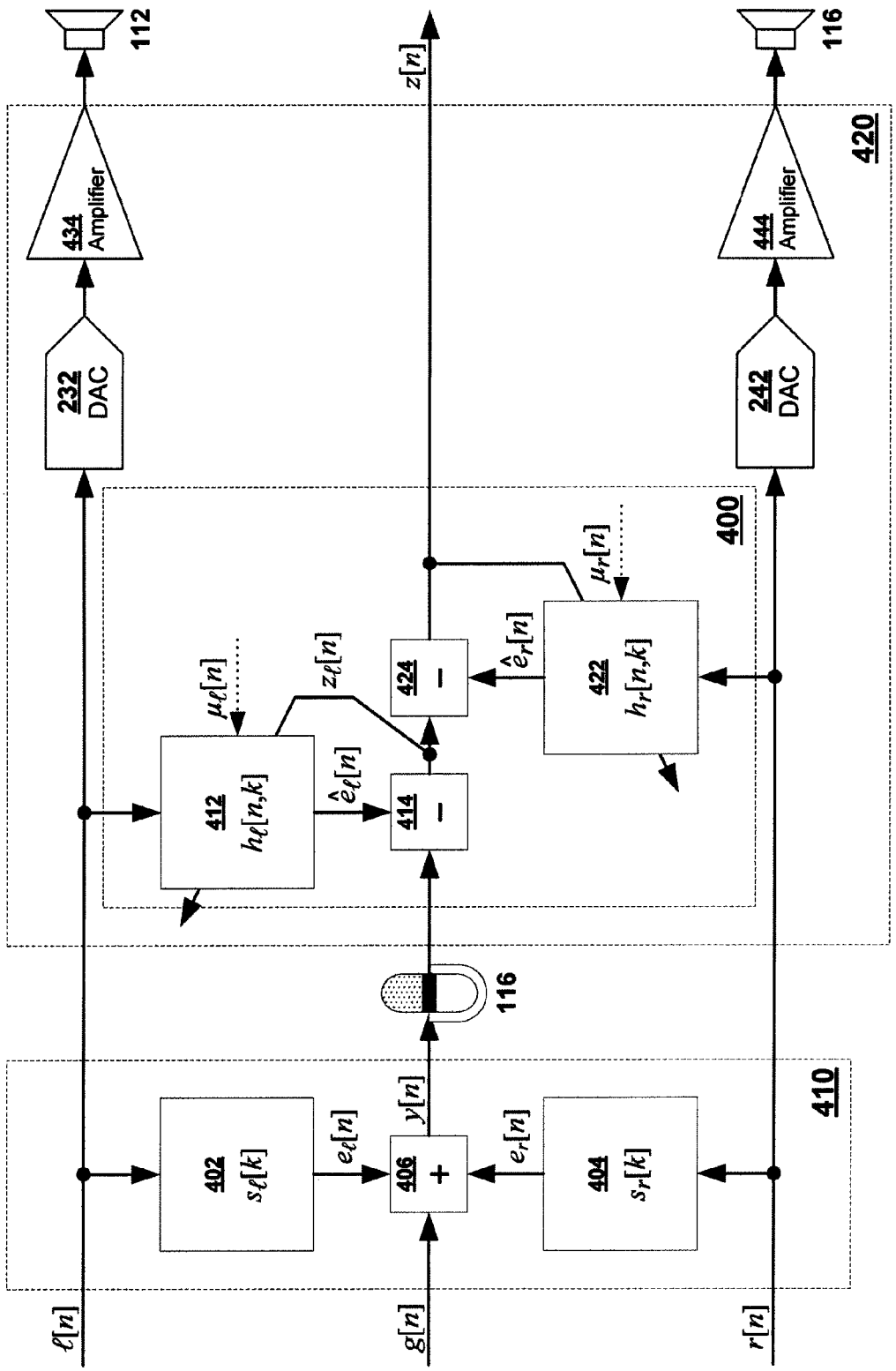
FIG. 4 is a signal diagram illustrating an exemplary embodiment of a stereo echo cancellation system.

FIG. 4 is a signal diagram illustrating an exemplary embodiment of a stereo echo cancellation system. The signal processing diagram includes model 410 of the echo and audio driver 420. The signals illustrated are digital signals. Left echo $e_l[n]$ is modeled as the result of echo transfer function 402 with impulse response $s_l[k]$ applied to left far-end signal l[n]. In addition, right echo $e_r[n]$ is modeled as the result of echo transfer function 404 with impulse response $s_r[k]$ applied to right far-end signal r[n]. Both echoes $e_l[n]$ and $e_r[n]$ are added with adder 406 to near-end signal g[n] resulting in a composite signal y[n]. Generally, the index n is a time index that is a discrete time variable and the index k is the sampling time index of an impulse response. It should be noted that microphone 116 receives an analog audio signal y(t) which is sampled through processing stages and an analog to digital converter into a digital signal y[n]. For clarity, those elements are omitted.

Audio driver 420 comprises 1) left channel DAC 232 and left channel amplifier 434 and 2) right channel DAC 242 and right channel amplifier 444. DAC 232 converts left far end signal l[n] into analog and DAC 242 converts right far end signal r[n] into analog. Amplifiers 434 and 444 shown here can be single stage amplifiers, two-stage amplifiers, three-stage amplifiers or other suitable configurations. Amplifiers 434 and 444 drive speakers 112 and 116, respectively. In another exemplary embodiment, DAC 232 and amplifier 434 can be replaced by a class-D amplifier, as can DAC 242 and amplifier 444.

Audio driver 420 also comprises stereo echo canceller 400, which further comprises left adaptive filter 412 and right adaptive filter 422. Left adaptive filter 412 has impulse response $h_l[n,k]$ which approximates the echo path of far end signal l[n] producing left echo estimate $\hat{e}_l[n]$. Subtractor 414 subtracts left echo estimate $\hat{e}_l[n]$ from received signal y[n] producing signal $z_1[n]$. At the same time, right adaptive filter 422 has impulse response $h_r[n,k]$ which approximates the echo path of far end signal r[n] producing right echo estimate $\hat{e}_r[n]$. Subtractor 424 subtracts right echo estimate $\hat{e}_r[n]$ from signal $z_1[n]$.

Mathematically, the total received signal at the microphone is $$y[n]=e_l[n]+e_r[n]+g[n], \quad (1)$$

where the left echo is modeled by $$e_l[n] = \sum_{k=0}^{L-1} s_l^*[k]l[n-k], \quad (2)$$

And the right echo is modeled by $$e_r[n] = \sum_{k=0}^{L-1} s_r^*[k]r[n-k], \quad (3)$$

where $s_l[k]$ and $s_r[k]$ are finite impulse responses of order L−1, although the echoes can be modeled as infinite impulse response filters. The output of the echo canceller, which is the signal transmitted by the telephone to the far-end, is given by $$z[n]=y[n]-\hat{e}_l[n]-\hat{e}_r[n] \quad (4)$$

where $\hat{e}_l[n]$ and $\hat{e}_r[n]$ are the estimated echoes and are approximated using adaptive linear filters of order L−1 given by $$\hat{e}_l[n] = \sum_{k=0}^{L-1} h_l^*[n,k]l[n-k], \quad (5)$$

and $$\hat{e}_r[n] = \sum_{k=0}^{L-1} h_r^*[n,k]r[n-k], \quad (6)$$

where $h_l[n,k]$ and $h_r[n,k]$ are the impulse responses of the adaptive filters at time sample n. Alternatively, the adaptive filters can approximate the echo using lower order filters. It should be noted that since the filter is adaptive, it changes over time, so the impulse response is also a function of time as shown.

In adapting the two adaptive filters, $z_1[n]$ would typically be used as an "error signal" to update adaptive filter $h_l[n,k]$, and z[n] would typically be used to update adaptive filter $h_r[n,k]$. That way, variations in adaptive filter $h_r[n,k]$ will not impact adaptive filter $h_l[n,k]$. One approach to adaptation of the adaptive filter is known as least mean squares (LMS), yielding the following adaptation equations:

$$h_l[n+1,k]=h_l[n,k]+\mu_l[n]z_1^*[n]l[n-k], \quad (7)$$

and $$h_r[n+1,k]=h_r[n,k]+\mu_r[n]z^*[n]r[n-k], \quad (8)$$

where $\mu_l[n]$ and $\mu_r[n]$ are non-negative numbers and are the adaptation coefficients, $0 \leq k < L$, $z_l[n]$ is the residual signal after the left echo canceller and $z[n]$ is the output of the echo canceller. While LMS typically achieves a minimum square error state with a wide range of values, the rate of adaptation defined by the adaptation coefficient is left unspecified. Appropriate adaptation rate control can yield a fast convergence of the echo approximator to the echo.

If the adaptation coefficient varies over time, the adaptive filter algorithm is referred to as a variable step size least mean squares (LMS) adaptive filtering algorithm. Prominent among these is the normalized LMS (NLMS) algorithm, which uses the adaptation coefficients:

$$\mu_{l[n]} = \frac{\mu_l}{LP_{ll}^L[n]}, \tag{9}$$

and $$\mu_r[n] = \frac{\mu_r}{LP_{rr}^L[n]}, \tag{10}$$

where $LP_{ll}^L[n]$ and $LP_{rr}^L[n]$ are a short-term energy of near-end signal $l[n]$ and $r[n]$, respectively, over a window of L samples, where L is the adaptive filter. For convenience, the short term energy is expressed in terms of the average energy over the window. The arithmetic average energy is equal to $$P_{xx}^L[n] = \frac{1}{L}\sum_{l=0}^{L-1} |x[n-l]|^2 \tag{11}$$

and where $\mu_l$ and $\mu_r$ are constants between 0 and 2. The NLMS adaptive filtering algorithm is insensitive to the scaling of $l[n]$ and $r[n]$, which makes it easier to control its adaptation rate by an appropriate choice of the adaptation coefficient.

While theoretically, the adaptation formulations of equations (7) and (8) work, in practice, the left channel adaptive filter 412 tends to also approximate the echo path of the right channel signal. This is because the left channel signal $l[n]$ is typically not uncorrelated with $r[n]$. Because left adaptive filter 412 is first in line in echo canceller 400, using signal $z_l[n]$ for its update, its approximation would dominate, causing right adaptive filter 422 to have a weak approximation. For example, if the two channels are initially highly correlated, the left adaptive filter 412 would generate an echo representative of both left and right channels. This echo cancellation will be initially effective, but as the right channel deviates, because right adaptive filter 422 has not adequately adapted to the right channel signal due to the influence of left adaptive filter 412, right adaptive filter 422 cannot adequately cancel the right channel echo.

Figure 5:
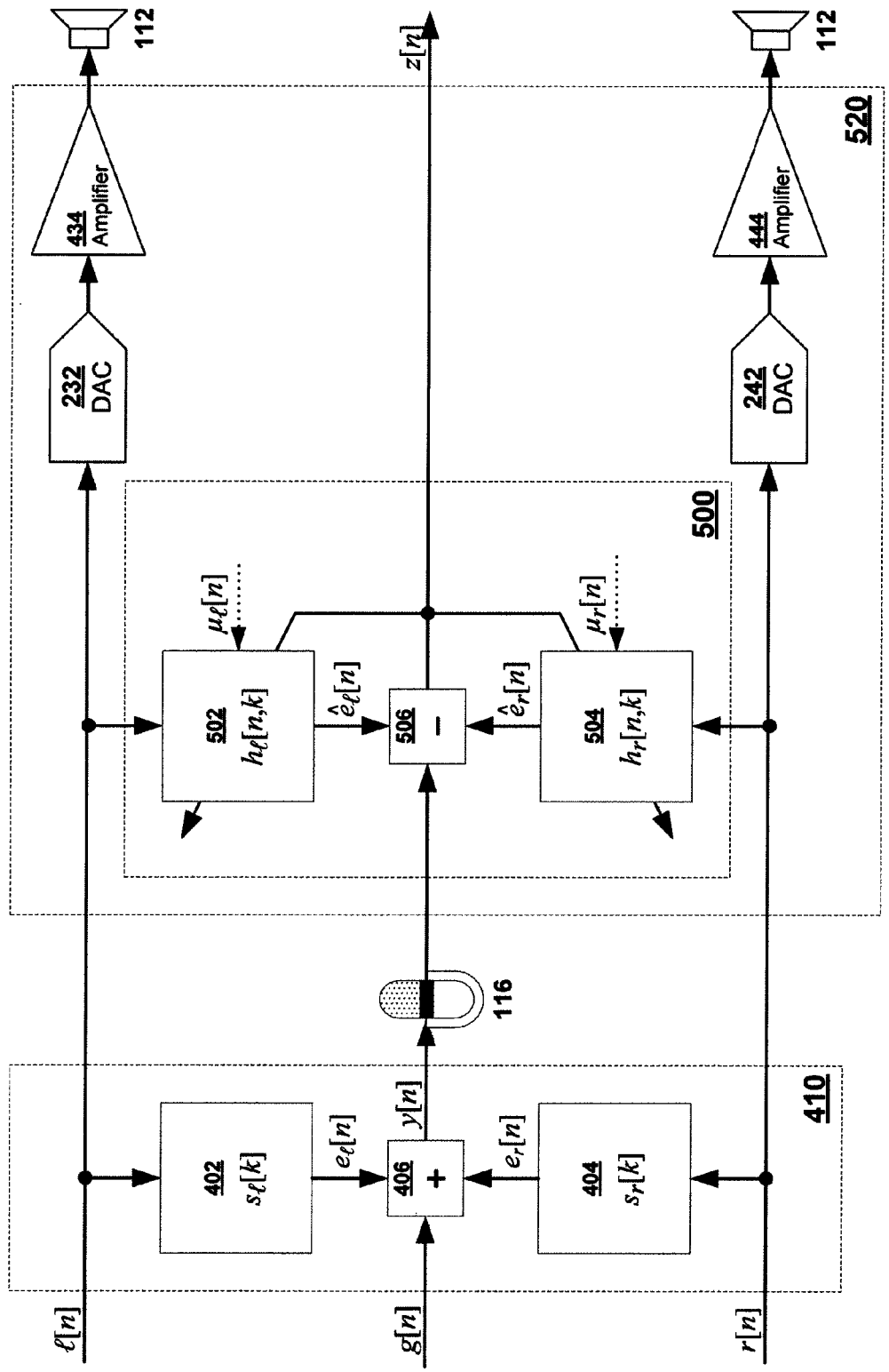
FIG. 5 is a signal processing diagram illustrating another exemplary embodiment of an audio driver and echo canceller.

FIG. 5 is a signal processing diagram illustrating another exemplary embodiment of an audio driver and echo canceller. Audio driver 520 comprises left DAC 232, left amplifier 434, right DAC 242, right amplifier 444 and echo canceller 500. Echo canceller 500 comprises left adaptive filter 502 and right adaptive filter 504. Left adaptive filter 502 has impulse response $h_l[n,k]$ which approximates the echo path of far end signal $l[n]$ producing left echo estimate $\hat{e}_l[n]$. At the same time, right adaptive filter 504 has impulse response $h_r[n,k]$ which approximates the echo path of far end signal $r[n]$ producing right echo estimate $\hat{e}_r[n]$. Subtractor 506 subtracts both left echo estimate $r[n]$ and right echo estimate $\hat{e}_r[n]$ from received signal $y[n]$. Both left and right adaptive filters will use the resulting echo canceller output $z[n]$ as an "error signal" for their adaptation.

By using this configuration, neither left adaptive filter 502 nor right adaptive filter 504 dominates. However, since both are adaptive, a degenerate situation can occur when the left far-end signal and right far-end signal are close to equal. For example, the left adaptive filter 502 may start to diverge with a large erroneous echo estimate and adaptive filter 504 may correct for the erroneous echo estimate. Initially, these two errors cancel each other out, but as the nature of the signal becomes more stereo, i.e., left far-end signal starts to differ from the right far-end signal, the error in both echoes can become significant. The problem can be even more severe when the left far-end signal and the right far-end signal are 180° out of phase.

It should be noted that in the remaining drawings, emphasis is placed on the echo cancellation system and additional audio driver components as well as speakers and microphones are no longer shown for reasons of clarity.

Figure 6:
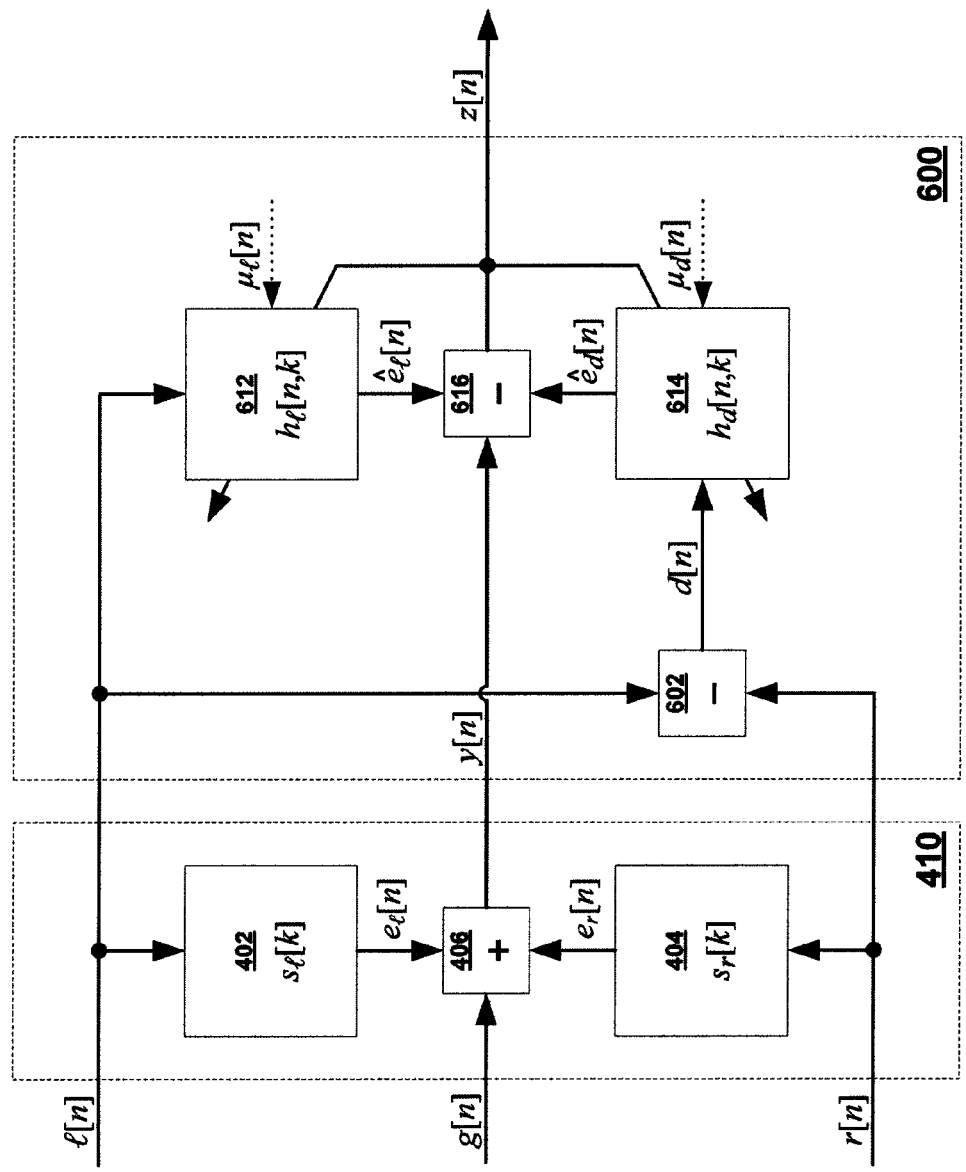
FIG. 6 is a signal diagram illustrating another exemplary embodiment of an echo cancellation system.

FIG. 6 is a signal diagram illustrating another exemplary embodiment of an echo cancellation system. Echo canceller 600 comprises left adaptive filter 612, subtractor 602, difference adaptive filter 614, and subtractor 616. Subtractor 602 generates a difference signal $d[n]=r[n]-l[n]$. Left adaptive filter 612 has impulse response $h_l[n,k]$ which approximates the echo path of far end signal $l[n]$, producing left echo estimate $\hat{e}_l[n]$. At the same time, difference adaptive filter 614 has impulse response $h_d[n,k]$ which approximates the effective echo path of difference signal $d[n]$ shown as difference echo estimate $\hat{e}_d[n]$. Subtractor 616 subtracts both left echo estimate $\hat{e}_l[n]$ and difference echo estimate $\hat{e}_d[n]$ from received signal $y[n]$. The adaptation of impulse response $h_d[n,k]$ follows equation (12).

$$\begin{aligned} h_d[n+1,k] &= h_d[n,k] + \mu_d[n]z^*[n]d[n-k] \\ &= h_d[n,k] + \mu_d[n]z^*[n](r[n-k]-l[n-k]) \end{aligned} \tag{12}$$

In the special case where signals $l[n]$ and $r[n]$ are identical, difference signal $d[n]$ is zero, which results in $\hat{e}_d[n]$ being zero and $h_d[n,k]$ not changing. In this case, the echo canceller would operate as a regular mono echo canceller. However, even with this modification, the degenerate situation can still arise when left adaptive filter 612 and difference adaptive filter 614 mutually cancel an error. This situation can be averted by ensuring that the adaptation rates of the two adaptive filters differ. For example, since the difference signal will typically be weaker, $\mu_d$ can be chosen smaller than $\mu_l$. Because the degenerate situation is avoided by making the two adaptation coefficients different, in an alternate embodiment $\mu_l$ is chosen smaller than $\mu_d$. In another alternative embodiment, $\mu_l$ and $\mu_d$ are chosen with different values and based on the relative strength of the left and difference signals. In yet another alternative embodiment, $\mu_l$ and $\mu_d$ are chosen with different values based on how correlated signals $l[n]$ and $r[n]$ are. If they are highly correlated, $\mu_l$ would be chosen to be relatively large and $\mu_d$ relatively small. If the correlation was small, $\mu_l$ would be chosen to be relatively small and $\mu_d$ relatively large. A correlation measure can, for example, be derived based on a time correlation of the two signals with different time delays. Furthermore, this principle applies not only to LMS and NLMS adaptation but to other adaptation choices, such as those disclosed in U.S. patent application Ser. No. 12/684,829, entitled "Systems and Methods for Echo Cancellation and Echo Suppression" filed on Jan. 8, 2010, which is hereby incorporated by reference herein for all purposes.

Echo cancellers 400 and 500 can be adapted to use difference echo estimate $\hat{e}_d[n]$ or more specifically the impulse response $h_d[n,]$ used. Rather than using equation (6) to define $\hat{e}_r[n]$, equation (13) is used instead. Alternatively, this can be expressed as using equation (6) with $h_r[n,k]$ defined by equation (14).

$$\hat{e}_r[n] = \sum_{k=0}^{L-1} (h_\ell^*[n,k] + h_d^*[n,k])r[n-k] \tag{13}$$

$$h_r[n,k] = h_\ell^*[n,k] + h_d^*[n,k] \tag{14}$$

Though echo canceller 500 using equation (13) or (14) would appear to yield different results than echo canceller 600, they are actually equivalent. In the former case, the correction signal is $z[n]-y[n]=\hat{e}_\ell[n]+\hat{e}_r[n]=2\hat{e}_\ell[n]+\hat{e}_d[n]$, and in the latter case, the correction signal is $z[n]-y[n]=\hat{e}_\ell[n]+\hat{e}_d[n]$. Since the left adaptive filter is a linear filter, left adaptive filter 612 simply learns $2h_\ell[n,k]$ as its transfer function where $h_\ell[n,k]$ is the transfer function of left adaptive filter 502.

Figure 7:
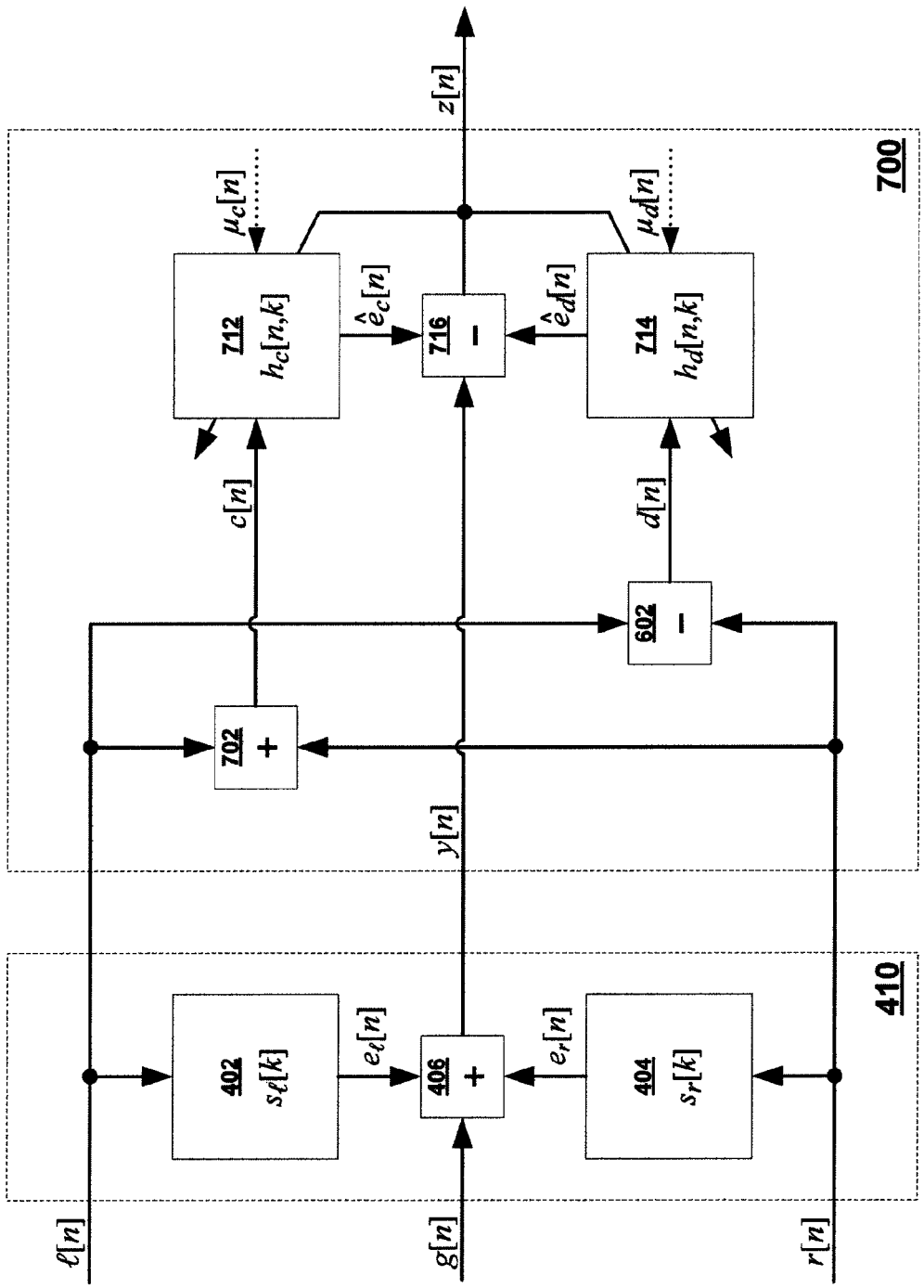
FIG. 7 is a signal diagram illustrating yet another exemplary embodiment of an echo cancellation system.

FIG. 7 is a signal diagram illustrating yet another exemplary embodiment of an echo cancellation system. Echo canceller 700 comprises center adaptive filter 712, adder 702, subtractor 602, difference adaptive filter 714, and subtractor 716. Adder 702 generates a center signal $c[n]=r[n]+l[n]$. Subtractor 602 generates a difference signal $d[n]=r[n]-l[n]$. Center adaptive filter 712 has impulse response $h_c[n,k]$ which approximates the effective echo path of center signal $c[n]$ producing center echo estimate $\hat{e}_c[n]$. At the same time, difference adaptive filter 714 has impulse response $h_d[n,k]$ which approximates the effective echo path of difference signal $d[n]$ shown as difference echo estimate $\hat{e}_d[n]$. Subtractor 716 subtracts both center echo estimate $\hat{e}_c[n]$ and difference echo estimate $\hat{e}_d[n]$ from received signal $y[n]$. The adaptation of impulse response $h_c[n,k]$ follows equation (12).

$$h_c[n+1,k] = h_c[n,k] + \mu_c[n]z^*[n]c[n-k] \tag{15}$$
$$= h_c[n,k] + \mu_c[n]z^*[n](r[n-k] + \ell[n-k])$$

To avoid the degenerate situation when center adaptive filter 712 and difference adaptive filter 712 mutually cancel an error, the rates of adaptation of the two filters are set to different rates. One way to achieve this is to insure $\mu_c$ is not equal to $\mu_d$. Because the center signal is often the dominant signal, it can be desirable, though not necessary, to select $\mu_c$ to be greater than $\mu_d$. Further, the adaptation rates can be based on a correlation measure of signals $l[n]$ and $r[n]$. Once again, this principle applies not only to LMS and NLMS adaptation but to other adaptation choices.

Echo cancellers 400 and 500 can be adapted to use difference echo estimate $\hat{e}_d[n]$ and center echo estimate $\hat{e}_c[n]$, or more specifically, to use the impulse responses of their echo paths $h_d[n,k]$ and $h_c[n,k]$. Rather than using equation (5) to define $\hat{e}_\ell[n]$, equation (16) is used instead. Rather than using equation (6) to define $\hat{e}_r[n]$, equation (18) is used instead. Alternatively, this can be expressed as using equation (5) with $h_\ell[n,k]$ defined by equation (17) and using equation (6) with $h_r[n,k]$ defined by equation (19).

$$\hat{e}_\ell[n] = \frac{1}{2}\sum_{k=0}^{L-1} (h_c^*[n,k] - h_d^*[n,k])r[n-k] \tag{16}$$

$$h_\ell[n,k] = \frac{1}{2}(h_c^*[n,k] - h_d^*[n,k]) \tag{17}$$

$$\hat{e}_r[n] = \frac{1}{2}\sum_{k=0}^{L-1} (h_c^*[n,k] + h_d^*[n,k])r[n-k] \tag{18}$$

$$h_r[n,k] = \frac{1}{2}(h_c^*[n,k] + h_d^*[n,k]) \tag{19}$$

Although echo canceller 500 using equations (16) or (17) and (18) or (19) would appear to yield different results than echo canceller 700, using similar analysis given above, they differ only by a factor of two, which is incorporated into the respective transfer functions. An alternate view is to define $$c[n] = \frac{1}{2}(r[n] + \ell[n])$$

and $$d[n] = \frac{1}{2}(r[n] - \ell[n]),$$

then echo canceller 500 using equations (16) or (17) and (18) or (19) is functionally identical to echo canceller 700.

Figure 8:
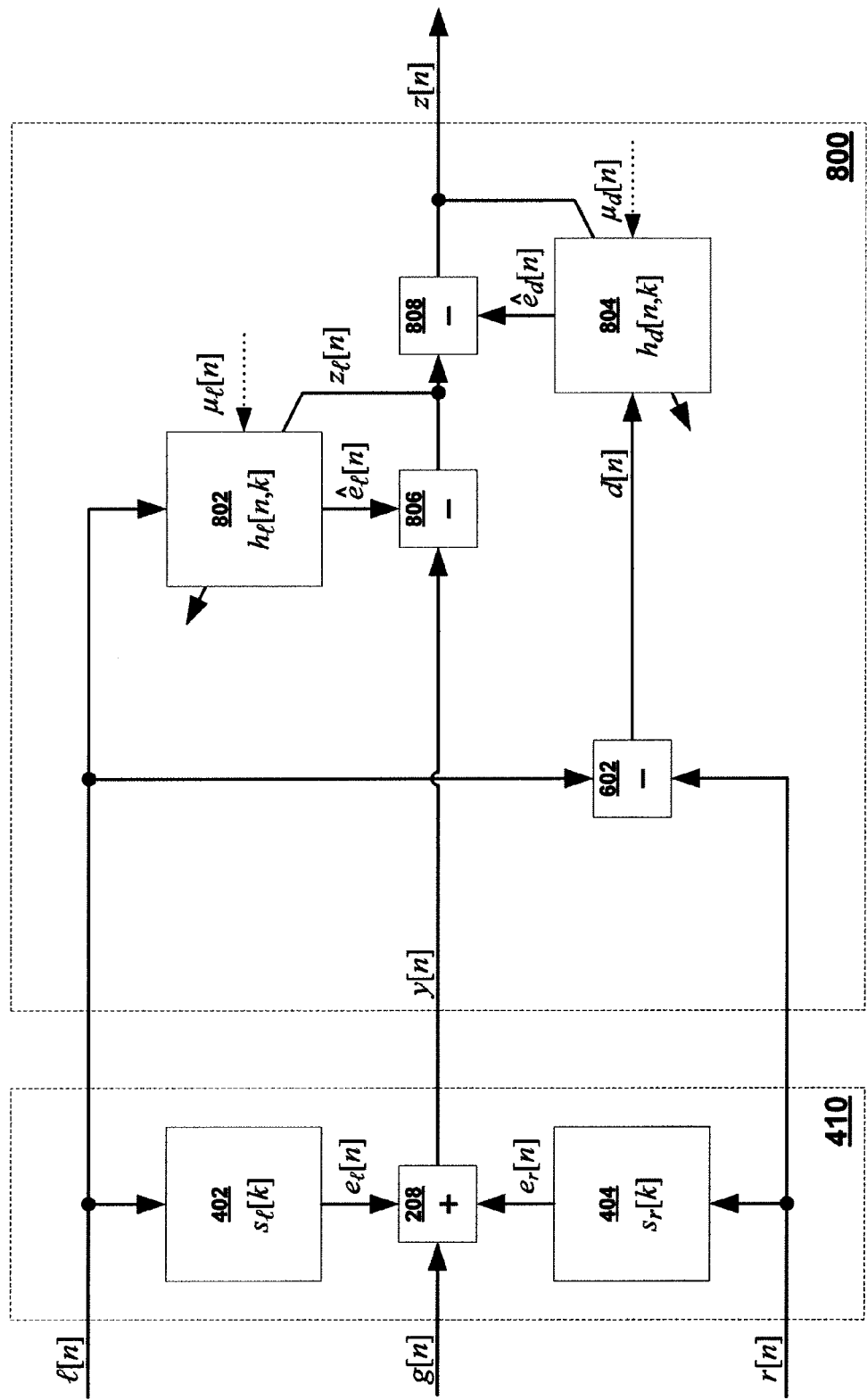
FIG. 8 is a signal diagram illustrating another exemplary embodiment of an echo cancellation system.

FIG. 8 is a signal diagram illustrating another exemplary embodiment of an echo cancellation system. Echo canceller 800 mirrors the architecture of echo canceller 400. It comprises subtractor 602, left adaptive filter 802, difference adaptive filter 804, subtractor 806, and subtractor 808. Subtractor 602 generates a difference signal $d[n]$. Left adaptive filter 802 has impulse response $h_\ell[n,k]$ which approximates the echo path of far end signal $l[n]$, producing left echo estimate $\hat{e}_\ell[n]$. At the same time, difference adaptive filter 804 has impulse response $h_d[n,k]$ which approximates the echo path of difference signal $d[n]$, producing right echo estimate $\hat{e}_d[n]$. First, subtractor 806 subtracts left echo estimate $\hat{e}_\ell[n]$ from received signal $y[n]$ to produce signal $z_1[n]$, and then subtractor 808 subtracts difference echo estimate $\hat{e}_d[n]$ from $z_1[n]$. Because the left far-end signal $l[n]$ signal generally dominates the difference signal $d[n]$, the shortcomings that cause echo canceller 400 to be undesirable are not as pronounced in echo canceller 800. In particular, if signals $l[n]$ and $r[n]$ are identical, difference signal $d[n]$ is zero, which results in $\hat{e}_d[n]$ being zero and $h_d[n,k]$ not changing. The echo canceller would operate as a regular mono echo canceller. Additionally, the rates of adaptation of the two filters can be set to different rates.

Figure 9:
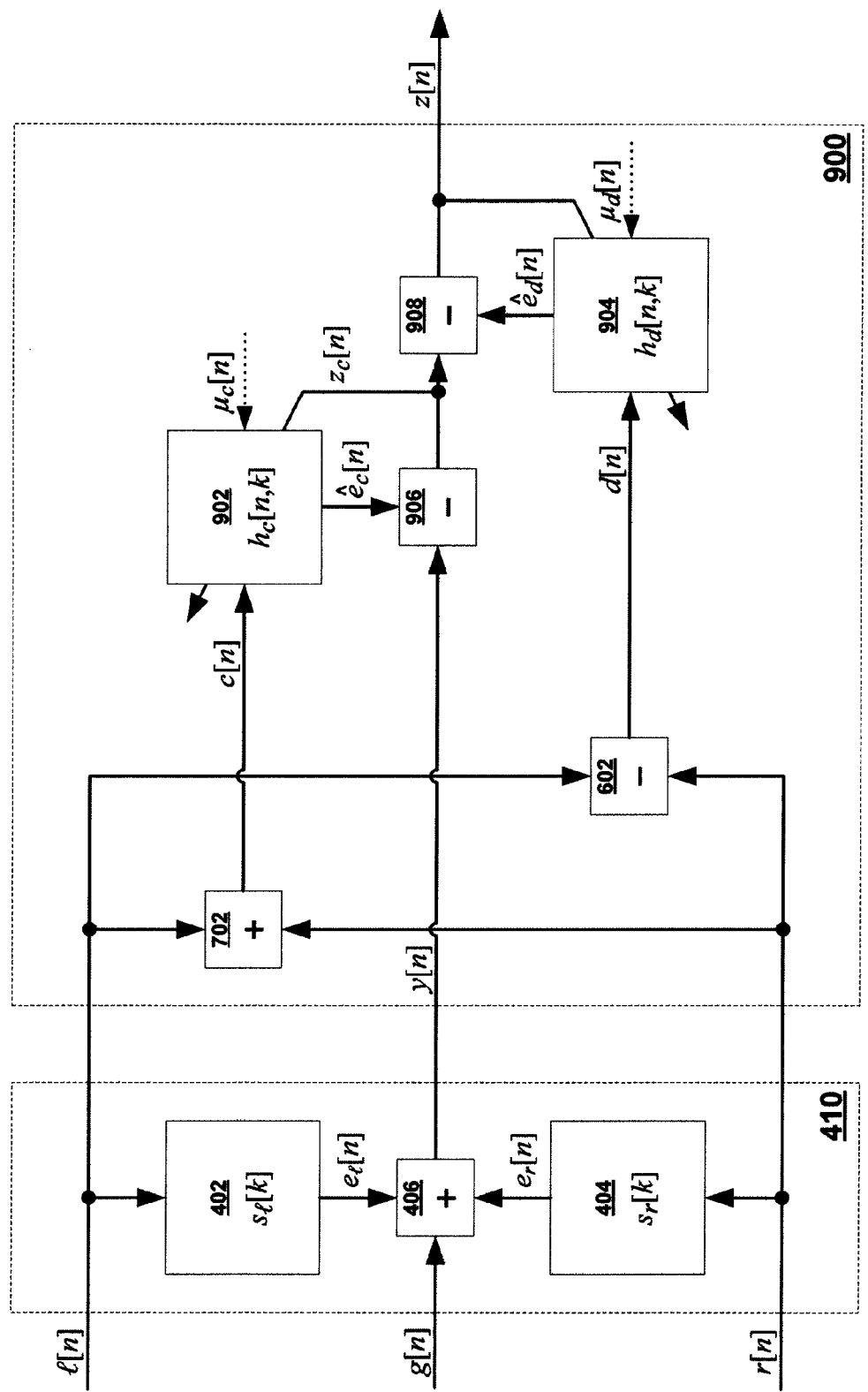
FIG. 9 is a signal diagram illustrating yet another exemplary embodiment of an echo cancellation system.

FIG. 9 is a signal diagram illustrating yet another exemplary embodiment of an echo cancellation system. Echo canceller 900 also mirrors the architecture of echo canceller 400. It comprises adder 702, subtractor 602, center adaptive filter 902, difference adaptive filter 904, subtractor 906, and subtractor 908. Adder 702 generates a center signal $c[n]$. Subtractor 602 generates a difference signal $d[n]$. Center adaptive filter 902 has impulse response $h_c[n,k]$ which approximates the effective echo path of center signal $c[n]$ producing center echo estimate $\hat{e}_c[n]$. At the same time, difference adaptive filter 904 has impulse response $h_d[n,k]$ which approximates the effective echo path of difference signal $d[n]$ shown as difference echo estimate $\hat{e}_d[n]$. First, subtractor 906 subtracts center echo estimate $\hat{ee}_c[n]$ from received signal $y[n]$ to produce signal $z_1[n]$, and then subtractor 908 subtracts difference echo estimate $\hat{e}_d[n]$ from $z_1[n]$. Because the center signal $c[n]$ generally dominates the difference signal $d[n]$, the shortcomings that cause echo canceller 400 to be undesirable are not as pronounced in echo canceller 900. Additionally, the rates of adaptation of the two filters can be set to different rates.

Some adaptation techniques tie the adaptation rate to certain signal values, such as the echo estimate. Because of this condition, care is needed during the adaptation process. A zero initial condition or a period of prolonged silence can cause the adaptation rate to be set to zero, so that the adaptive filters no longer adapt. One solution is to never let the adaptation rate go to zero. Another solution is to introduce a synthetic echo.

Figure 10:
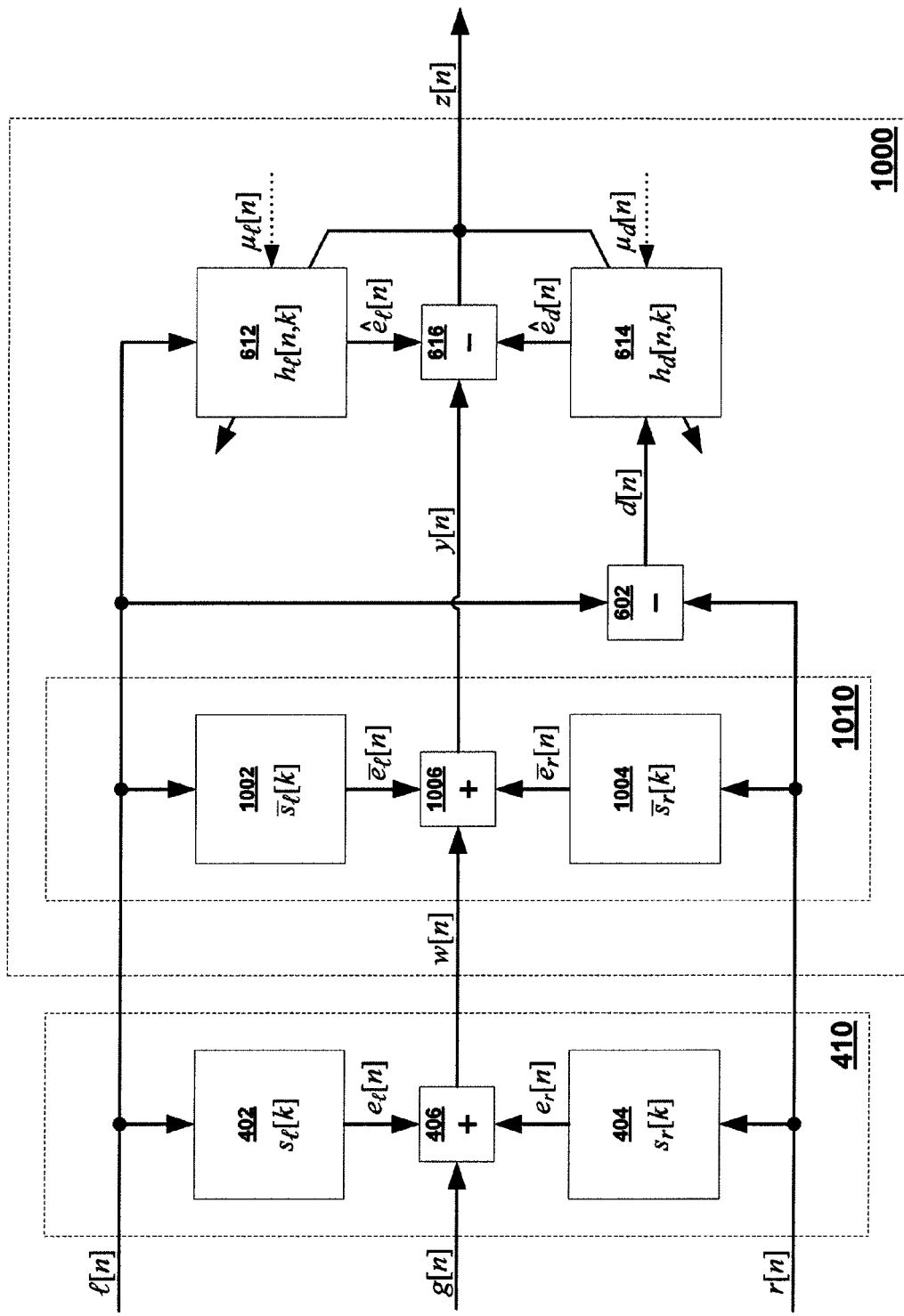
FIG. 10 is a signal diagram illustrating an exemplary embodiment of an echo cancellation system with a synthetic echo.

FIG. 10 is a signal diagram illustrating an exemplary embodiment of an echo cancellation system with a synthetic echo. Echo canceller 1000 is similar to echo canceller 600, except that in addition to subtractor 602, left adaptive filter 612, difference adaptive filter 614, and subtractor 616, echo canceller 1000 further comprises synthetic echo module 1010. Synthetic echo module 1010 comprises left echo synthesizer 1002, which has an impulse response of $\bar{s}_l[k]$ of order L−1, right echo synthesizer 1004, which has an impulse response of $\bar{s}_r[k]$ of order L−1, and adder 1006. Left echo synthesizer 1002 generates a synthetic left echo signal $\bar{e}_l[n]$ as a function of the left far-end signal $l[n]$ based on equation (20). Right echo synthesizer 1004 generates a synthetic right echo signal $\bar{e}_r[n]$ as a function of the right far-end signal $r[n]$ based on equation (21). Adder 1006 combines left synthetic echo signal $\bar{e}_l[n]$ and right synthetic echo signal $\bar{e}_r[n]$ into the actual received signal $w[n]$ to generate a processed received signal $y[n]$, on which the adaptive filters 612 and 614 operate.

$$\bar{e}_l[n] = \sum_{k=0}^{L-1} \bar{s}_l^*[k]\ell[n-k] \quad (20)$$

$$\bar{e}_r[n] = \sum_{k=0}^{L-1} \bar{s}_r^*[k]r[n-k] \quad (21)$$

Adding a synthetic echo component helps to prevent the echo estimate $\hat{e}$ from being zero, thus preventing the adaptive coefficient from reaching a state where the adaptive coefficient is constantly zero. Because the synthetic echo is artificially created, the impulse response is known, so the linear adaptive filter will cancel the synthetic echo. Furthermore, since the choice of synthetic echo for both the left and right channels can be arbitrarily chosen, it is advantageous to select echo transfer functions which are uncorrelated or orthogonal. This selection can aid in avoiding degenerate situations between the two adaptive filters.

Figure 11:
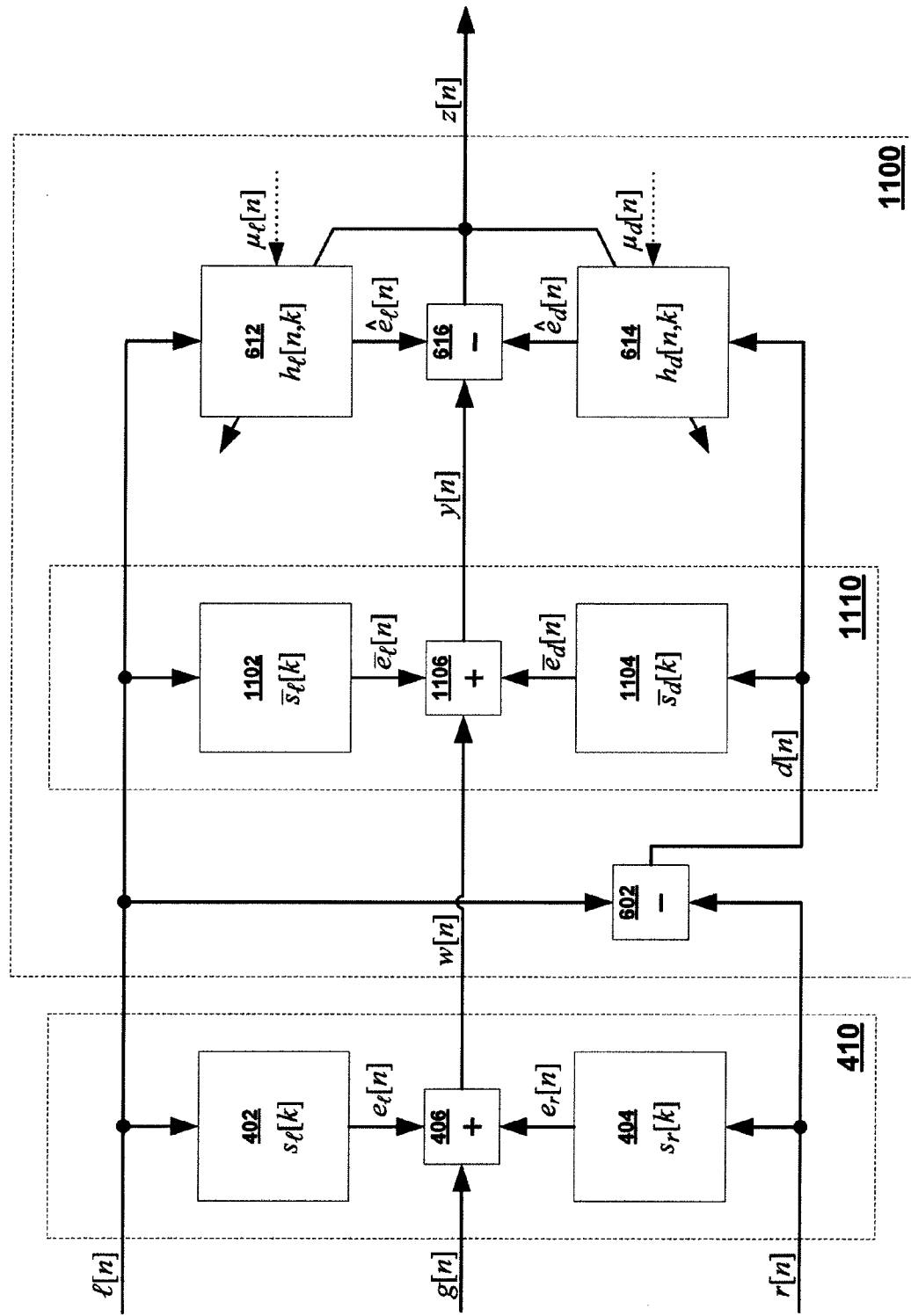
FIG. 11 is a signal diagram illustrating another exemplary embodiment of an echo cancellation system with a synthetic echo.

FIG. 11 is a signal diagram illustrating another exemplary embodiment of an echo cancellation system with a synthetic echo. Echo canceller 1100 is similar to echo canceller 600 except that in addition to subtractor 602, left adaptive filter 612, difference adaptive filter 614, and subtractor 616, echo canceller 1100 further comprises synthetic echo module 1110. Synthetic echo module 1110 differs from synthetic echo module 1010 because it generates a synthetic echo of the difference signal rather than the right far-end signal. Synthetic echo module 1110 comprises left echo synthesizer 1102 which has an impulse response of $\bar{s}_l[k]$ of order L−1, difference echo synthesizer 1104 which has an impulse response of $\bar{s}_d[k]$ of order L−1 and adder 1106. Left echo synthesizer 1102 generates a synthetic left echo signal $\bar{e}_l[n]$ as a function of the left far-end signal $l[n]$ based on equation (20). Difference echo synthesizer 1104 generates a synthetic difference echo signal $\bar{e}_d[n]$ as a function of the difference signal based on equation (22). Adder 1106 combines left synthetic echo signal $\bar{e}_l[n]$ and difference synthetic echo signal $\bar{e}_d[n]$ into the actual received signal $w[n]$ to generate a processed received signal $y[n]$ on which the adaptive filters 612 and 614 operate.

$$\bar{e}_d[n] = \sum_{k=0}^{L-1} \bar{s}_d^*[k]d[n-k] \quad (22)$$

Because the synthetic echoes in this case echo precisely the signals that left adaptive filter 612 and difference adaptive filter 614 are targeted to, a choice of orthogonal or uncorrelated impulse responses can aid in the echo cancellation.

Figure 12:
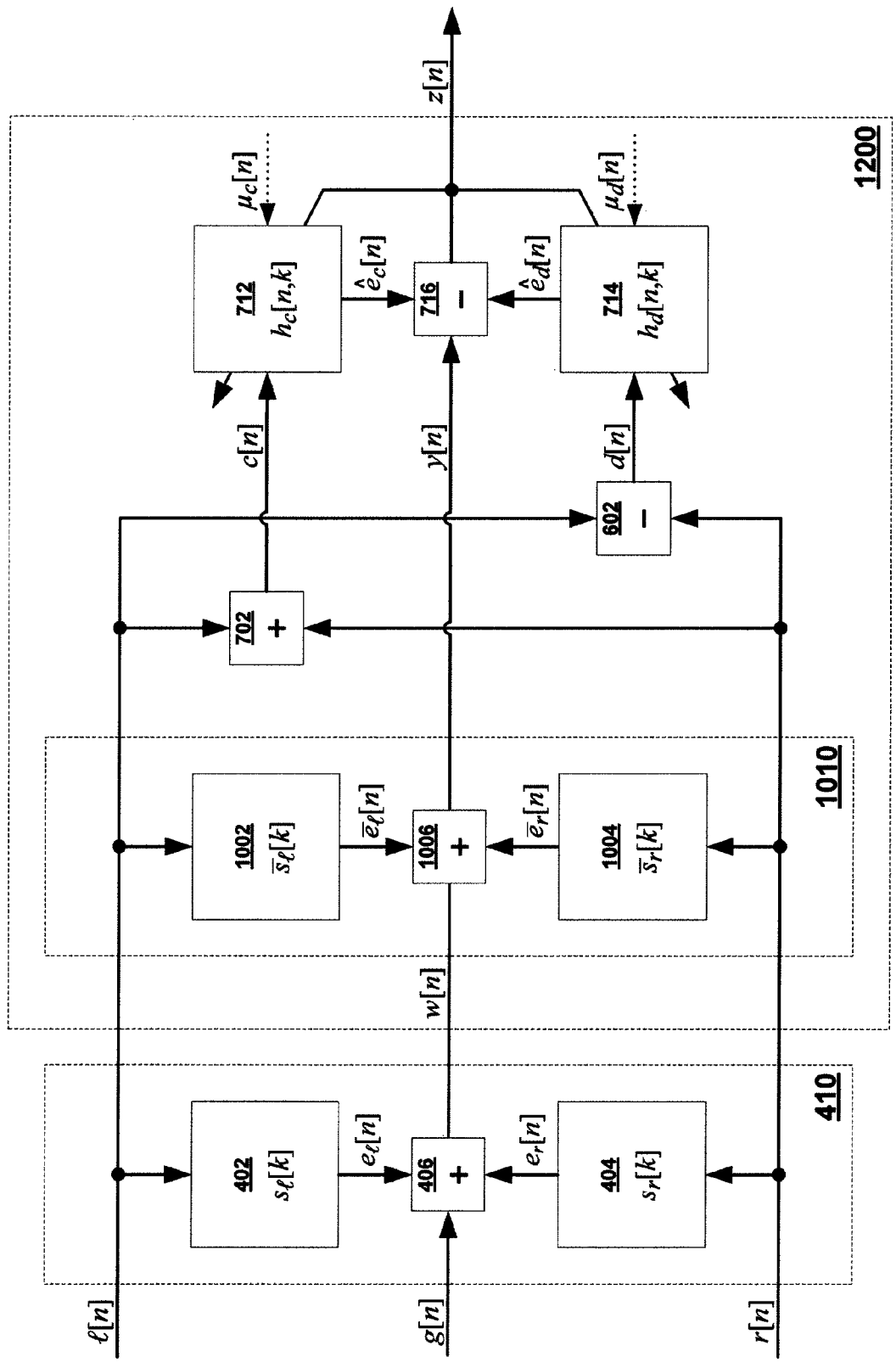
FIG. 12 is a signal diagram illustrating yet another exemplary embodiment of an echo cancellation system with a synthetic echo.

FIG. 12 is a signal diagram illustrating yet another embodiment of an echo cancellation system with a synthetic echo. Echo canceller 1200 is similar to echo canceller 600 except that in addition to subtractor 602, adder 702, center adaptive filter 712, difference adaptive filter 714, and subtractor 716, echo canceller 1200 further comprises synthetic echo module 1010. Synthetic echo module 1010 comprises left echo synthesizer 1002, right echo synthesizer 1004 and adder 1006 as described above.

Figure 13:
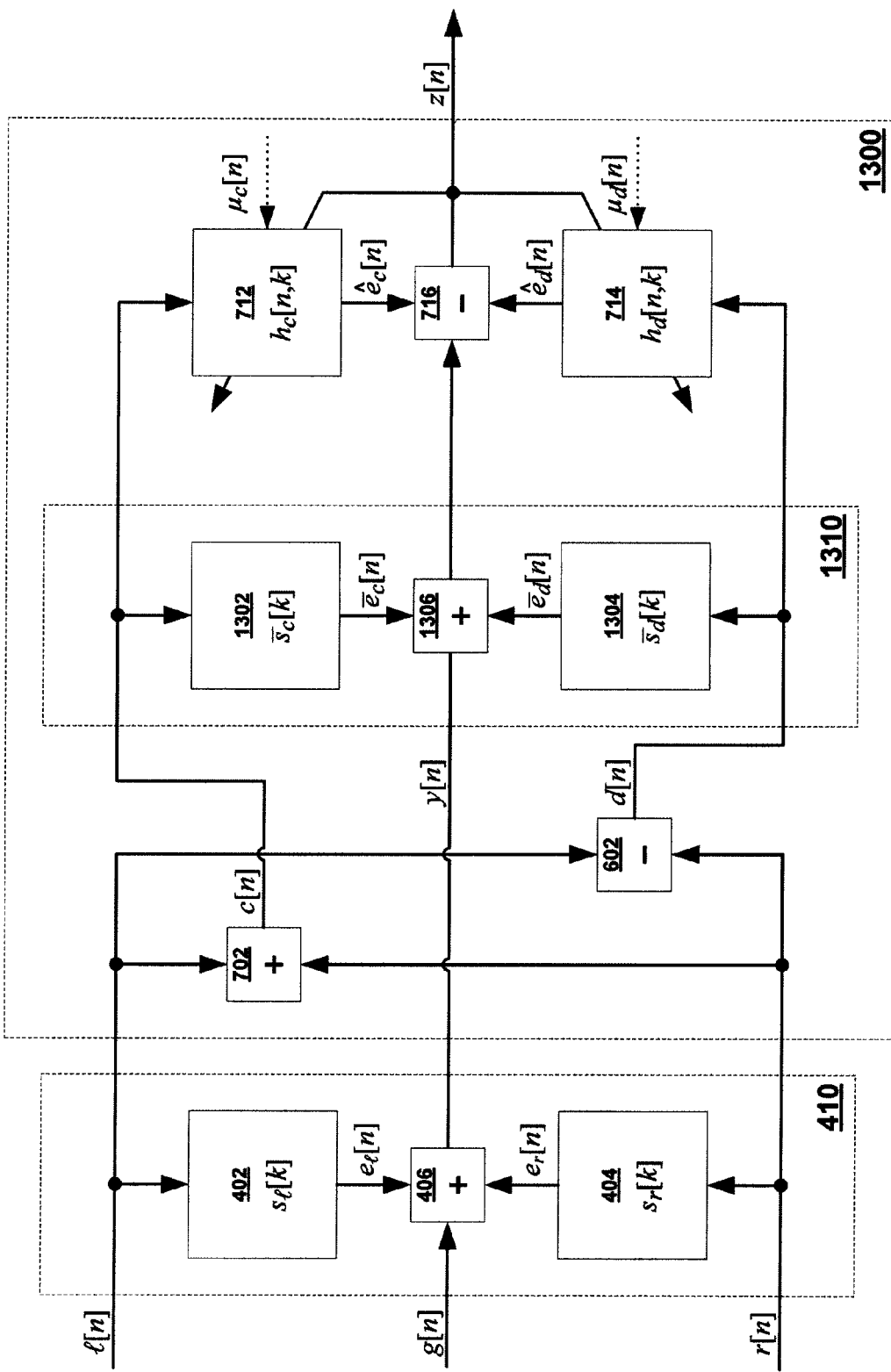
FIG. 13 is a signal diagram illustrating another exemplary embodiment of an echo cancellation system with a synthetic echo.

FIG. 13 is a signal diagram illustrating another exemplary embodiment of an echo cancellation system with a synthetic echo. Echo canceller 1300 is similar to echo canceller 600, except that in addition to subtractor 602, adder 702, center adaptive filter 712, difference adaptive filter 714, and subtractor 716, echo canceller 1300 further comprises synthetic echo module 1310. Synthetic echo module 1310 differs from synthetic echo module 1010 and 1100 because it generates a synthetic echo of the center signal rather than the left far-end signal and a synthetic echo of the difference signal rather than the right far-end signal. Synthetic echo module 1310 comprises center echo synthesizer 1302, which has an impulse response of $\bar{s}_c[k]$ of order L−1, difference echo synthesizer 1304, which has an impulse response of $\bar{s}_d[k]$ of order L−1 and adder 1306. Center echo synthesizer 1302 generates a synthetic center echo signal $\bar{e}_c[n]$ as a function of the center signal $c[n]$ based on equation (23). Difference echo synthesizer 1304 generates a synthetic difference echo signal $\bar{e}_d[n]$ as a function of the difference signal based on equation (22). Adder 1306 combines center synthetic echo signal $\bar{e}_c[n]$ and difference synthetic echo signal $\bar{e}_d[n]$ into the actual received signal $y[n]$ to generate a processed received signal $w[n]$ on which the adaptive filters 612 and 614 operate.

$$\bar{e}_c[n] = \sum_{k=0}^{L-1} \bar{s}_c^*[k]c[n-k] \quad (23)$$

Because the synthetic echoes in this case match the signals that left adaptive filter 712 and difference adaptive filter 714 are targeted to, a choice of orthogonal or uncorrelated impulse responses can aid in the echo cancellation.

Like monaural echo cancellation and suppression, subband processing can be used to improve echo cancellation. Though many of the signals involved in the echo cancellation process, such as the near-end signal, far-end signals, echoes, and echo approximations are correlated, when divided into sub-bands, some of these signals can be assumed to be virtually uncorrelated leading to improved echo cancellation.

Figure 14:
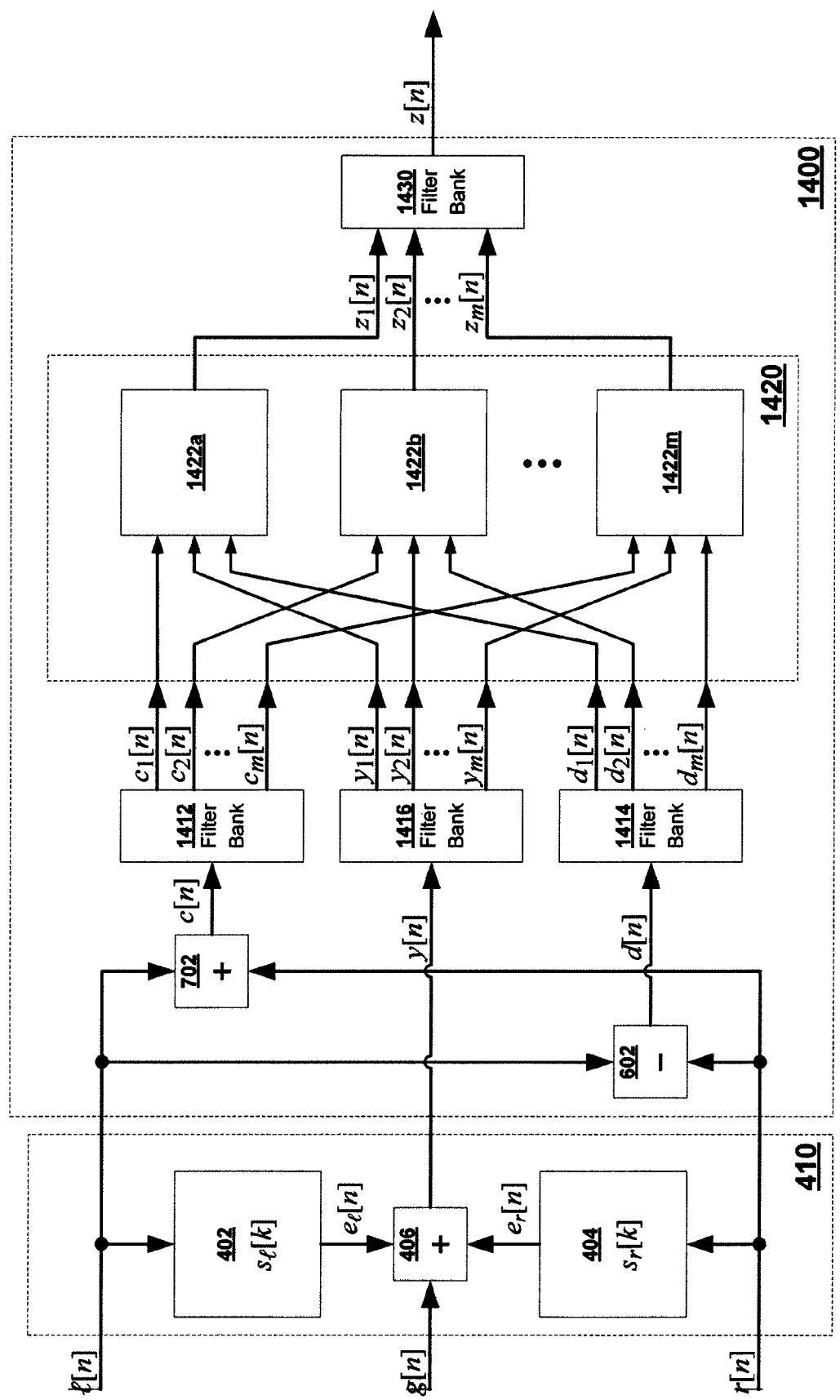
FIG. 14 is a signal diagram illustrating an exemplary embodiment of an echo cancellation system using sub-band processing.

FIG. 14 is a signal diagram illustrating an exemplary embodiment of an echo cancellation system using sub-band processing. Echo canceller 1400 comprises subtractor 602, adder 702, center filter bank 1412, difference filter bank 1414, received filter bank 1416, sub-band echo cancellation unit 1420 and synthesis filter bank 1430. Subtractor 602 generates a difference signal d[n]. Adder 702 generates a center signal c[n]. Center filter bank 1412 subdivides center signal c[n] into m frequency sub-hand components, $c_1[n], c_2[n], \ldots, c_m[n]$. Difference filter bank 1414 subdivides difference signal d[n] into m frequency sub-band components, $d_1[n], d_2[n], \ldots, d_m[n]$. Received filter bank 1416 subdivides received signal y[n] into m frequency sub-band components, $y_1[n], y_2[n], \ldots, y_m[n]$. Sub-band echo cancellation unit 1420 comprises m sub-band echo cancellers, e.g., echo cancellers 1422a, 1422b, ... 1422m. Each echo canceller receives one sub-band component of the center signal $c_i[n]$, one sub-band component of the difference signal $d_i[n]$ and one sub-hand component of the received signal $y_i[n]$ and generates an echo suppressed output signal $z_i[n]$. Synthesis filter bank 1430 combines all the output signals $z_i[n]$ in each sub-band into a final output signal z[n].

Each echo canceller can comprise a linear echo canceller, such as a pair of adaptive filters as described above, non-linear processing for echo suppression, a combination of both, or other suitable combinations. Sub-band processing can also be used to suppress residual echo resultant from a linear echo canceller.

Figure 15:
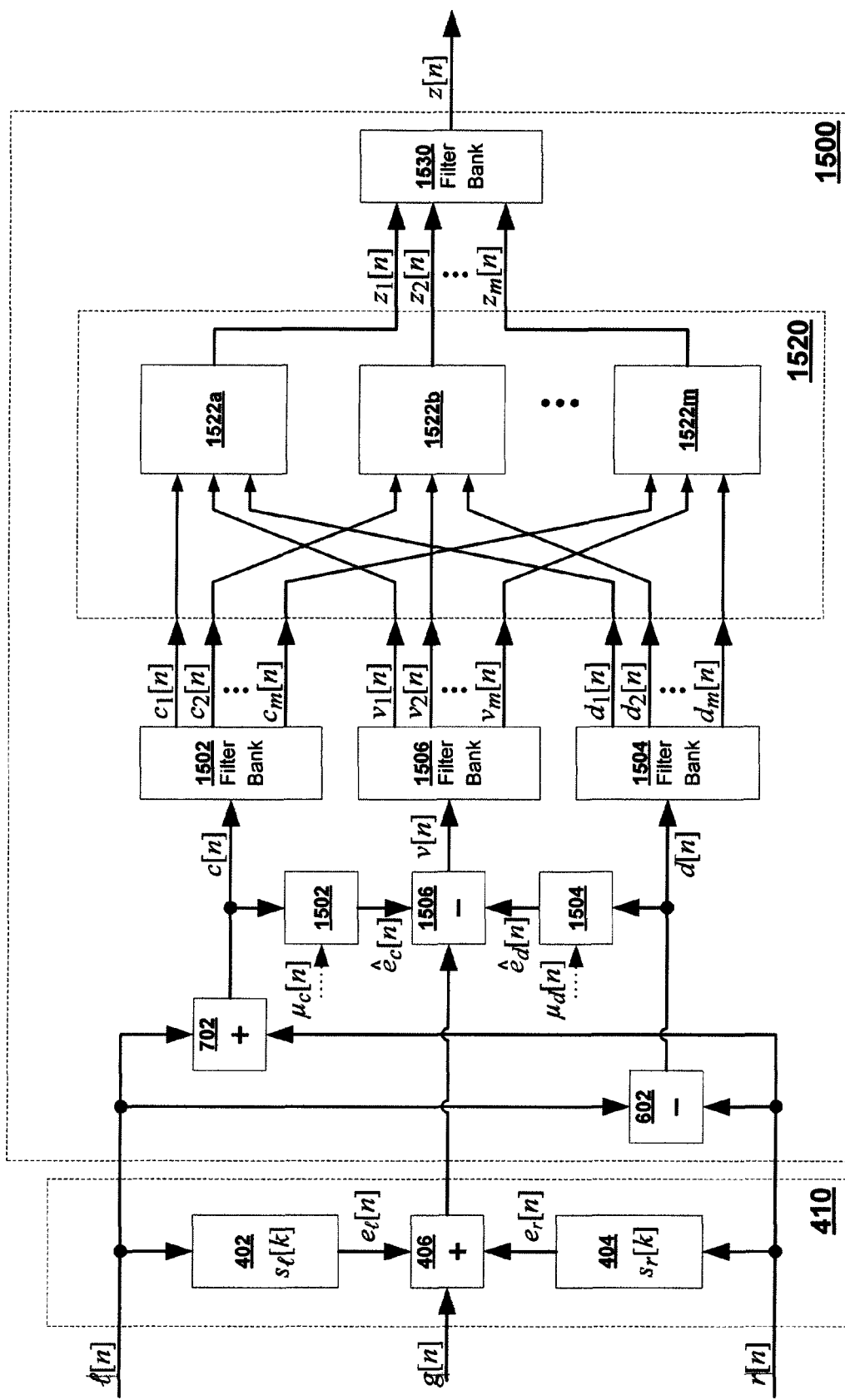
FIG. 15 is a signal diagram illustrating another exemplary embodiment of an echo cancellation system using sub-band processing.

FIG. 15 is a signal diagram illustrating another exemplary embodiment of an echo cancellation system using sub-band processing. Echo canceller 1500 comprises subtractor 602, adder 702, center adaptive filter 1502, left adaptive filter 1504, subtractor 1506, center filter bank 1512, difference filter bank 1514, received filter bank 1516, sub-band echo cancellation unit 1420 and synthesis filter bank 1530. Subtractor 602 generates a difference signal d[n]. Adder 702 generates a center signal c[n]. Center adaptive filter 1502 has impulse response $h_c[n,k]$ which approximates the echo of center signal c[n], shown as center echo estimate $\hat{e}_c[n]$. At the same time, difference adaptive filter 1504 has impulse response $h_d[n,k]$ which approximates the echo of difference signal d[n], shown as difference echo estimate $\hat{e}_d[n]$. Subtractor 1506 subtracts both center echo estimate $\hat{e}_c[n]$ and difference echo estimate $\hat{e}_d[n]$ from received signal y[n], leaving signal v[n], which is the near end signal with a residual error. Center filter bank 1512 subdivides center signal c[n] into m frequency sub-band components, $c_1[n], c_2[n], \ldots, c_m[n]$. Difference filter bank 1514 subdivides difference signal d[n] into m frequency sub-band components, $d_1[n], d_2[n], \ldots, d_m[n]$. Received filter bank 1516 subdivides received signal v[n] into m frequency sub-hand components, $v_1[n], v_2[n], \ldots, v_m[n]$. Sub-band echo cancellation unit 1520 comprises m sub-band echo cancellers, e.g., echo cancellers 1522a, 1522b, ... 1522m. Each echo canceller receives one sub-band component of the center signal $c_i[n]$, one sub-band component of the difference signal $d_i[n]$ and one sub-band component of the received signal $v_i[n]$, and generates an echo suppressed output signal $z_i[n]$. Synthesis filter bank 1530 combines all the output signals $z_i[n]$ in each sub-band into a final output signal z[n].

In this exemplary embodiment, each echo canceller can comprise a linear echo canceller, such as a pair of adaptive filters as described above, non-linear processing for echo suppression, a combination of both or other suitable combinations. Furthermore, since echo canceller 1500 comprises linear echo cancellation outside of the sub-band processing in this exemplary embodiment, non-linear echo suppression may be preferable for use in the sub-band echo cancellation unit 1520.

It should be noted that echo canceller 1400 and 1500 use a center signal and a difference signal. However, it is clear that the left far-end signal could be used in place of the center signal. It should also be noted that though the examples set forth herein use the left far-end signal, the roles of the left channel and right channel can also be reversed.

It should be emphasized that the above-described embodiments are merely examples of possible implementations. Many variations and modifications can be made to the above-described embodiments without departing from the principles of the present disclosure. All such modifications and variations are intended to be included herein within the scope of this disclosure and protected by the following claims.

What is claimed:

1. A method of cancelling an echo comprising:
generating a difference signal by subtracting a first far-end signal from a second far-end signal;
generating a first echo cancellation signal by applying a first adaptive filter to only the first of the far-end signals;
generating a difference echo cancellation signal by applying a difference adaptive filter to the difference signal;
subtracting the first echo cancellation signal from a received signal;
subtracting the difference echo cancellation signal from the received signal;
updating the first adaptive filter at a first adaptation rate; and
updating the difference adaptive filter at a second adaptation rate, where the first adaptation rate is different from the second adaptation rate.

2. The method of claim 1, further comprising:
updating the first adaptive filter on the basis of a first signal resulting from subtracting the first echo cancellation signal from the received signal; and
updating the second adaptive filter on the basis of a second signal resulting from subtracting the difference echo cancellation signal and the first echo cancellation signal from the received signal.

3. The method of claim 1, further comprising:
updating the first adaptive filter and the second adaptive filter on the basis of a signal resulting from subtracting the difference echo cancellation signal and the first echo cancellation signal from the received signal.

4. The method of claim 1, further comprising:
synthesizing a synthetic first echo on the basis of the first far-end signal;
synthesizing a synthetic second echo on the basis of the second far-end signal; and
adding the synthetic first echo and the synthetic second echo to the received signal.

5. The method of claim 1, further comprising:
synthesizing a synthetic first echo on the basis of the first far-end signal;
synthesizing a synthetic difference echo on the basis of the difference signal; and
adding the synthetic first echo and the synthetic difference echo to the received signal.

6. The method of claim 1, further comprising:
dividing the first far-end signal into a plurality of first sub-band signals;
dividing the difference signal into a plurality of difference sub-band signals;
dividing the received signal into a plurality of received sub-band signals;

for each first sub-band signal, difference sub-band signal and received sub-band signal sharing a common sub-band, applying echo cancellation to generate a sub-band output signal; and combining a plurality of sub-band output signals into an output signal.

7. A stereo echo cancellation system comprising:
a first signal subtractor operable to generate a difference signal by subtracting a first far-end signal from a second far-end signal;
a first adaptive filter operable to generate a first echo estimate from only the first of the far-end signals;
a difference adaptive filter operable to generate a difference echo estimate from the difference signal;
a second signal subtractor operable to subtract the first echo estimate from a received signal;
a third signal subtractor operable to subtract the difference echo estimate from the received signal; and
wherein the first adaptive filter has an adaptation rate different from an adaptation rate for the difference adaptive filter.

8. The stereo echo cancellation system of claim 7, wherein the first adaptive filter is updated on the basis of a first signal resulting from subtracting the first echo from the received signal, and the second adaptive filter is updated on the basis of a second signal resulting from subtracting the difference echo and the first echo from the received signal.

9. The stereo echo cancellation system of claim 7, wherein the first adaptive filter and the second adaptive filter are updated on the basis of a signal resulting from subtracting the difference echo and the first echo from the received signal.

10. The stereo echo cancellation system of claim 7, further comprising:
a first echo synthesizer operable to generate a first synthetic echo on the basis of the first far-end signal;
a second echo synthesizer operable to generate a second synthetic echo on the basis of the second far-end signal; and
a mixer operable to mix the first synthetic echo and the second synthetic echo to the received signal.

11. The stereo echo cancellation system of claim 7, further comprising:
a first echo synthesizer operable to generate a first synthetic echo on the basis of the first far-end signal;
a difference echo synthesizer operable to generate a difference synthetic echo on the basis of the difference signal; and
a mixer operable to mix the first synthetic echo and the difference synthetic echo to the received signal.

12. The stereo echo cancellation system of claim 7, wherein the adaptation rate for the first adaptive filter and the adaptation rate for the difference adaptive filter is based on the relative strength of the difference signal and the first far-end signal.

13. The stereo echo cancellation system of claim 7, wherein the adaptation rate for the first adaptive filter and the adaptation rate for the difference adaptive filter is based on a measure of correlation between the first far-end signal and the difference signal.

14. The stereo echo cancellation system of claim 7, wherein the adaptation rate for the first adaptive filter and the adaptation rate for the difference adaptive filter is based on a measure of correlation between the first far-end signal and the difference signal.

15. The stereo echo cancellation system of claim 7, wherein the adaptation rate for the first adaptive filter and the adaptation rate for the difference adaptive filter is based on a measure of correlation between the first far-end signal and the second far-end signal.

16. The stereo echo cancellation system of claim 7 further comprising:
a first filter bank operable to divide a first signal into a plurality of first signal frequency components;
a second filter bank operable to divide the difference signal into a plurality of difference signal frequency components;
a third filter bank operable to divide the received signal into a plurality of received signal frequency components;
for each first signal frequency component, a first adaptive filter operable to generate a first echo estimate component from the first signal frequency component;
for each difference signal frequency component, a difference adaptive filter operable to generate a difference echo estimate component from the difference signal frequency component;
for each received signal frequency component, a first signal subtractor operable to subtract a corresponding first echo estimate component from the received signal frequency component and a second signal subtractor operable to subtract a corresponding difference echo estimate component from the received signal frequency components to produce an echo-cancelled signal;
a synthesis filter bank operable to combine the plurality of echo-cancelled signal frequency components; and
wherein each first adaptive filter corresponds to a difference adaptive filter and each first adaptive filter has an adaptation rate different from an adaptation rate for the corresponding difference adaptive filter.

17. The stereo echo cancellation system of claim 16, wherein the adaptation rate for each first adaptive filter and the adaptation rate for each difference adaptive filter is based on a relative strength of the difference signal frequency component and the first signal frequency component.

* * * * *